United States Patent [19]

Riza et al.

[11] Patent Number: 5,208,880
[45] Date of Patent: May 4, 1993

[54] MICRODYNAMICAL FIBER-OPTIC SWITCH AND METHOD OF SWITCHING USING SAME

[75] Inventors: Nabeel A. Riza, Clifton Park, N.Y.; Dennis L. Polla, Brooklyn Park, Minn.

[73] Assignee: General Electric Company, Schenectady, N.Y.

[21] Appl. No.: 876,274

[22] Filed: Apr. 30, 1992

[51] Int. Cl.⁵ ................................................ G02B 6/26
[52] U.S. Cl. ........................................ 385/18; 385/16; 385/25; 385/31; 385/47
[58] Field of Search .................... 385/16, 17, 18, 22, 385/24, 25, 36, 33, 34, 31, 47

[56] References Cited

U.S. PATENT DOCUMENTS

| | | | |
|---|---|---|---|
| 4,239,331 | 12/1980 | Aoyama | 385/33 |
| 4,322,126 | 3/1982 | Minowa et al. | 385/33 |
| 4,854,658 | 8/1989 | Stanley | 385/18 |
| 5,133,030 | 7/1992 | Lee | 385/16 |
| 5,146,513 | 9/1992 | Inoue et al. | 385/13 |

FOREIGN PATENT DOCUMENTS

| | | | |
|---|---|---|---|
| 3147875 | 6/1983 | Fed. Rep. of Germany | 385/34 X |
| 57-139704 | 8/1982 | Japan | 385/18 X |
| 62-99717 | 5/1987 | Japan | 385/36 |
| 1594336 | 7/1981 | United Kingdom | 385/34 X |

OTHER PUBLICATIONS

"High-Displacement Piezoelectric Actuation Utilizing a Meander Line Geometry-Part 1-Experimental Characteristics" by W. P. Robbins, D. L. Polla, et al., IEEE Transactions on Ultrasonic Ferroelectrics, and Frequency Control, vol. 38, Sep. 1991.

*Primary Examiner*—Brian Healy
*Attorney, Agent, or Firm*—Donald S. Ingraham; Marvin Snyder

[57] ABSTRACT

A microdynamical optical switch includes a piezoelectric actuator disposed on a substrate, a mirror securely mechanically coupled to the actuator, an input connection port, and a plurality of output connection ports. The actuator displaces the mirror along a mirror displacement path such that the mirror, which is oriented at a 45° angle to the path of the incident light, deflects light passing from the input connection port into an output connection port. The actuator includes a plurality of piezoelectric bars mechanically coupled together in series in a meander line geometry such that the cumulative deflection of the piezoelectric bars is used to displace the mirror. The amount of displacement of the actuator is governed by a controllable voltage source, which applies a voltage across each of the piezoelectric bars. In one embodiment the microdynamical switch has a 1×n arrangement, in which light entering through one input connection port is selectively directed to one of n output connection ports. In an alternative embodiment, the switch has a 2×2 arrangement in which light beams entering through two ports are individually selectively directed to one of two respective outlet ports.

20 Claims, 3 Drawing Sheets

MICRODYNAMICAL FIBER-OPTIC SWITCH AND METHOD OF SWITCHING USING SAME

Field of the Invention

This invention relates generally to optical processing systems and more particularly to optical switches employed in fiber optic networks.

BACKGROUND OF THE INVENTION

Optical switches are devices used to direct (or steer) optical beams in a desired direction. Optical switches typically have input ports to receive optical signals from one or more channels and two or more output ports into which the optical signal can be directed. Such switches are commonly referred to be the number of input ports and the number of output ports; for example a switch having one input port and two output ports is referred to as a 1×2 switch; a switch with "n" output ports would be designated as a 1×n switch. Similarly, if the switch has 2 input ports and 2 output ports, it is referred to as a 2×2 switch. Optical switching occurs when an input beam is directed from its input port to a selected output port.

Optical signals are commonly carried in optical fibers, which provide a compact and efficient light channel through which the optical signals can pass. Efficient switching of optical signals between respective fibers is necessary in most optical processing systems or networks to achieve the desired routing of the signals. Desirable performance characteristics for fiber optic switches (i.e., optical switches directing signals between respective optical fibers) include having low loss (e.g., <1 db), low cross-talk (i.e., high channel isolation, e.g. >50 db), relatively fast switching speeds (e.g., tens of microseconds for a 1×2 or 2×2 switch), polarization-independent operation, and rugged construction, so that the switch can be operated in high temperature and relatively dirty environments. Such performance parameters would enable fiber optic switches to be used in a number of applications, such as phased array radars, communication systems, and engine sensor networks (e.g., in aircraft engines).

Conventional fiber optic switches do not provide these desired operating characteristics. Most conventional fiber optic switches are either lithium niobate based switches or liquid crystal switches. The operation of lithium niobate based switches is polarization sensitive, and thus these switches necessarily require the use of polarization-preserving optical fibers, and also require careful input/output waveguide mode matching in the optical system or network. Lithium niobate based switches are relatively lossy (about 5 db optical insertion loss per switch) and provide only a moderate degree of channel isolation (e.g., 20 db). These characteristics, coupled with the fact that such switches require intricate fabricating processes to form the optical waveguides in the switch and couple those waveguides to optical fibers, make the use of such switches in large optical signal processing systems, such as phased array antennas that require thousands of switches arranged in cascade configurations, impractical. Liquid crystal switches offer relatively high on/off ratios (e.g., 36 db) and relatively low (e.g., less than 1 db) optical insertion losses, but typically require processing systems using polarized light. Additionally, liquid crystal switches cannot be operated in high temperature environments (e.g., >450° C.) or dirty environments, such as encountered in turbine engines.

It is accordingly an object of this invention to provide a rugged optical switch capable of efficient operation at high temperatures.

It is a further object of this invention to provide an optical switch having a polarization independent and wavelength independent switching mechanism.

Another object of this invention is to provide an optical switch having high channel isolation, fast switching speeds, and low optical insertion loss.

It is yet a further object of this invention to provide a readily fabricated switch that is compact and robust.

SUMMARY OF THE INVENTION

In accordance with this invention, a microdynamical optical switch includes a silicon substrate on which the switch architecture is disposed. A piezoelectric actuator is disposed on the substrate and is mechanically coupled to a mirror such that the mirror is displaced along a mirror displacement path in correspondence to deflection of the piezoelectric actuator. The switch has at least one optical input connection port and a plurality of optical output connection ports, the input connection port and the output connection ports being disposed in a spaced relationship so that light passing from the input connection port is directed to a selected output connection port in dependence on the position of the mirror along the mirror displacement path.

The piezoelectric actuator is advantageously a meander line microactuator including a plurality of piezoelectric bars mechanically coupled together in series and electrically coupled together in parallel. A controllable voltage source is electrically coupled to the microactuator such that the deflection of the microactuator corresponds to the amplitude of the voltage applied. The mirror is securely coupled to the microactuator by an actuating arm such that the deflection of the microactuator causes the mirror to be displaced along the mirror displacement path. The mirror has one or more optically reflective surfaces, each of which is oriented at substantially a 45° angle to the path of the light passing from the optical input port such that light passing from the optical input port strikes the mirror and is reflected to pass along a path that is substantially at right angles to the path of the light incident on the mirror.

In an optical switch in which there is only one optical input port, the path along which the mirror is displaced is substantially aligned with the path of the incident light emanating from the optical input port. The optical output ports are disposed at 90° angles to the mirror displacement path such that the mirror can deflect light emanating from the input port by 90° into an output port. The particular output port that receives the light is determined by the location of the mirror along its displacement path. In a switch having two input ports and two output ports, the ports are arranged in a cross-pattern such that when the mirror is displaced outside the path of the light, the light passes from either input port directly into a respective output port aligned on the same axis; when the mirror is shifted along its displacement path so that the light emanating from the input ports strikes the mirror, the light from each respective input port is deflected by 90° and enters the other output port, i.e., a different output port from the one into which the light entered when the mirror was displaced outside the path of light emanating from the input port.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
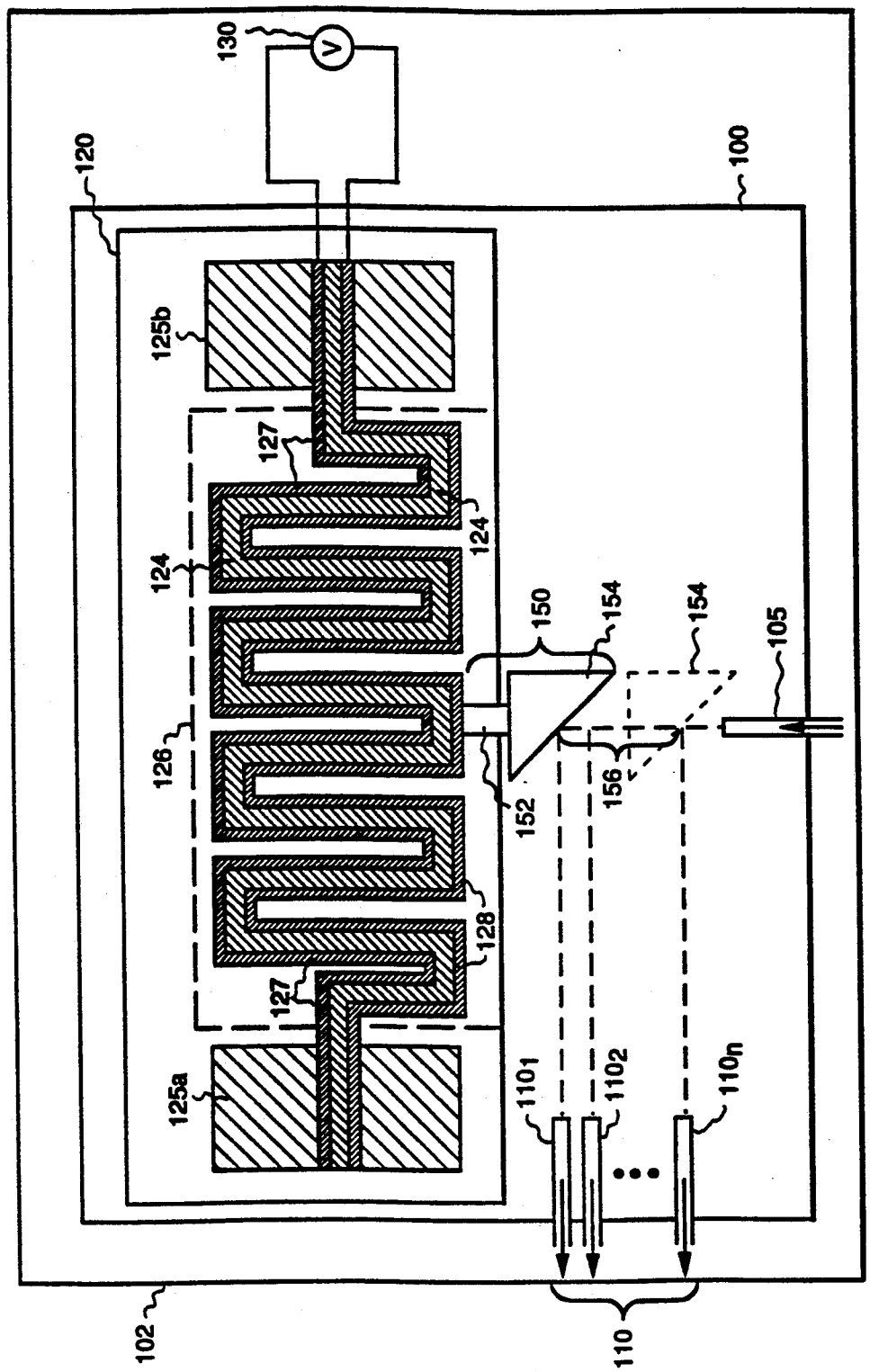
FIG. 1 is a part block and part schematic representation of a 1×n optical switch comprising a meander line geometry piezoelectric actuator in accordance with one embodiment of the present invention.

FIG. 1 illustrates a 1×n microdynamical fiber-optic switch 100 disposed on a substrate 102. In accordance with this invention, switch 100 comprises an input optical connection port 105 and a plurality of output optical connection ports 110, a piezoelectric actuator 120, and a mirror assembly 150 that is securely mechanically coupled to actuator 120.

Substrate 102 is typically a silicon wafer or similar substrate material on which the various materials necessary to form the piezoelectric actuator can be readily deposited and patterned. Such a silicon wafer is also readily micromachined to produce grooves into which the various optical fibers carrying signals to and from the switch can be securely fastened.

Optical input connection port 105 advantageously comprises a single mode optical fiber which is fastened to substrate 102 and switch 100 so that all light emanating from the connection port propagates along substantially the same axis. Each optical output port $110_1$, $110_2$, ... $110_n$, similarly also comprises a single mode optical fiber fastened to substrate 102 and switch 100. The optical fibers are advantageously positioned in silicon V-grooves etched into substrate 102. Each optical output port is aligned along an axis that is oriented at substantially right angles with respect to the axis of input port connection 105.

Piezoelectric actuator 120 is coupled to a voltage source 130 that can be controlled to vary the amplitude of the voltage applied to the piezoelectric actuator. Voltage source 130 typically supplies direct current (dc); alternatively a time-varying or alternating voltage source can be used. Actuator 120 is preferably a meander line microactuator comprising at least one, and typically a plurality of, piezoelectric bars (also known as unimorphs) 124 mechanically coupled together in series in a meander line geometry (or configuration). Both ends of the meander line geometry of piezoelectric bars are securely attached to anchors 125a, 125b respectively, which anchors provide a foundation that remains stationary with respect to the substrate when the piezoelectric bars expand or contract in response to applied voltages. The piezoelectric bars comprise a thin film of piezoelectric material such as lead zirconate titanate ($Pb(Zr_1Ti)O_3$, aluminum nitride (AlN), zinc oxide (ZnO), lead titanate ($PbTiO_3$), or the like, and are disposed on a polycrystalline silicon mechanical support structure 126, which also serves as a ground electrode. The maximum temperature at which the piezoelectric actuator can operate is a function of the material which comprises the unimorphs; for example aluminum nitride can operate in temperatures up to about 700° C., zinc oxide up to about 500° C., lead zirconate titanate up to about 380°–400° C., and lead titanate up to about 340° C. The piezoelectric bars are micromachined to produce the desired dimensions and linkages between bars. A typical piezoelectric bar has a thickness of about 2 μm, a width of about 40 μm, and a length of about 500 μm. Electrodes 127, 128 are disposed along the opposing lengthwise faces of each piezoelectric bar, and are connected to voltage source 130 so as to be oppositely polarized. Electrodes 127, 128 comprise a conductive material such as aluminum.

Application of voltage across piezoelectric material results in stresses or strains in the piezoelectric material that cause the bar to expand or contract. The piezoelectric polarity between bars is alternated to cause linear expansion in one bar and linear contraction in an adjacent bar. When the geometry of piezoelectric bars 124 is mechanically attached to substrate 102 by anchors 125 at selected points, these stresses or strains can be used to cause individual piezoelectric bars to be deflected in predetermined directions. The geometry of the plurality of the bars and the mechanical connections between them is used to generate an actuator displacement that is the sum of the individual displacement of each bar. For example, piezoelectric bars can be connected in geometrics which result in either a horizontal linear displacement with respect to the substrate (a folded path geometry) or a vertical linear displacement with respect to the substrate (a ladder-like geometry). In either case, the piezoelectric bars at each end of the meander line geometry are typically anchored so that they do not move with respect to the substrate, and the intermediate bars are mechanically connected in series in a fashion to generate the desired collective displacement in response to applied voltages. Piezoelectric thin film actuators of the type advantageously used in this invention are discussed in the article entitled "High-Displacement Piezoelectric Actuation Utilizing a Meander Line Geometry-Part I-Experimental Characteristics" by W.P. Robbins, D.L. Polla, et al., *IEEE Transactions on Ultrasonics, Ferroelectrics, and Frequency Control*, Vol. 38, September 1991, which is incorporated herein by reference.

Mirror assembly 150 comprises an actuator arm 152 which is affixed to piezoelectric actuator 120 and to a mirror 154. Mirror 154 is rigidly attached to actuator arm 152 such that the orientation of the mirror with respect to the actuator arm is fixed, and actuator arm 152 is attached to actuator 120 such that substantially the only motion imparted to mirror 154 when actuator 120 is operated is linear displacement along a mirror displacement path 156. Mirror 154 has an optically reflective surface, comprising, for example, gold electroplated to an underlying foundation having a smooth surface. The reflective surface of the mirror is oriented at substantially a 45° angle to the path of the light passing from input connection port 105 such that light incident on the mirror is reflected onto a path substantially 90° from the path of the light emanating from the input connection port. The path of the reflected light causes the light to enter one of the output connection ports 110. Actuator arm 152 is typically linked to the piezoelectric bar substantially in the center of the meander line geometry in order to provide the greatest range of displacement of mirror assembly 150.

In operation, the application of a voltage to piezoelectric actuator 120 results in deflection of piezoelectric bars 124, in turn causing actuator arm 152 is translated in a substantially linear motion so that mirror 154 to be displaced along displacement path 156. Actuator 120 is disposed so that displacement path 156 is substantially aligned with the axis of the input connection port, i.e., the mirror displacement path is substantially colinear and coincident with the center of the beam of light emerging from input connection port 105. Thus, as mirror 154 is displaced along mirror displacement path 156 by actuator 120 by a distance corresponding to the voltage applied to the actuator, light passing from input connection port 105 will be deflected (i.e., reflected) into a selected one of the output connection ports 110 dependent upon where along the mirror displacement path the mirror is positioned. Thus, as illustrated in FIG. 1, when the piezoelectric actuator is not deflected, mirror 154 is disposed closest to actuator 120 and light entering through input connection port 105 is deflected into output connection port $110_1$. When actuator 120 is fully deflected, the mirror is disposed farthest away from actuator 120 (in the position shown in phantom as 154' in FIG. 1), and the light entering through input connection port 105 is deflected into output connection port $110_n$. Similarly, by controlling the voltage applied to piezoelectric actuator 120 to achieve the desired deflection, mirror 154 can be selectively positioned along mirror displacement path 156 at locations to reflect light from input port 105 into a selected one of the output connection ports 110.

In a typical 1×2 microdynamical optical switch in accordance with this invention, the optical input and output connection port comprise single mode optical fibers. Such fibers commonly have relatively small core sizes (about 3 μm) and the mirror need be moved only a small predetermined distance, e.g., 10 μm, in order to accomplish the switching operation. Such a 10 μm displacement is readily obtained by coupling actuator arm 152 directly to piezoelectric actuator 120. This coupling arrangement results in relatively fast switching times, allowing the switch to change positions within several microseconds.

As long as the distance that the light must traverse between input connection port 105 and one of the output connection ports 110 is relatively short, e.g., less than about 50 μm, there is little optical coupling loss due to free-space propagation beam spreading. If the arrangement of the switch requires longer distances between input ports and output ports, optical collimating devices (not shown) such as GRIN (graded index) lenses or SELFOC (self focussing) lenses are coupled to the input and output fibers to minimize free-space propagation beam spreading. GRIN lenses, for example, typically have a diameter in the range of about 1 mm to 2 mm, which necessitates that the input and output connection ports be placed at least that distance apart. Such a spacing between fibers further necessitates larger displacements of the mirror along the mirror displacement path (e.g., several millimeters) to operate the switch, which in turn requires the use of levers or the like (not shown) to allow the microactuator to produce sufficient displacement of the mirror.

Figure 2:
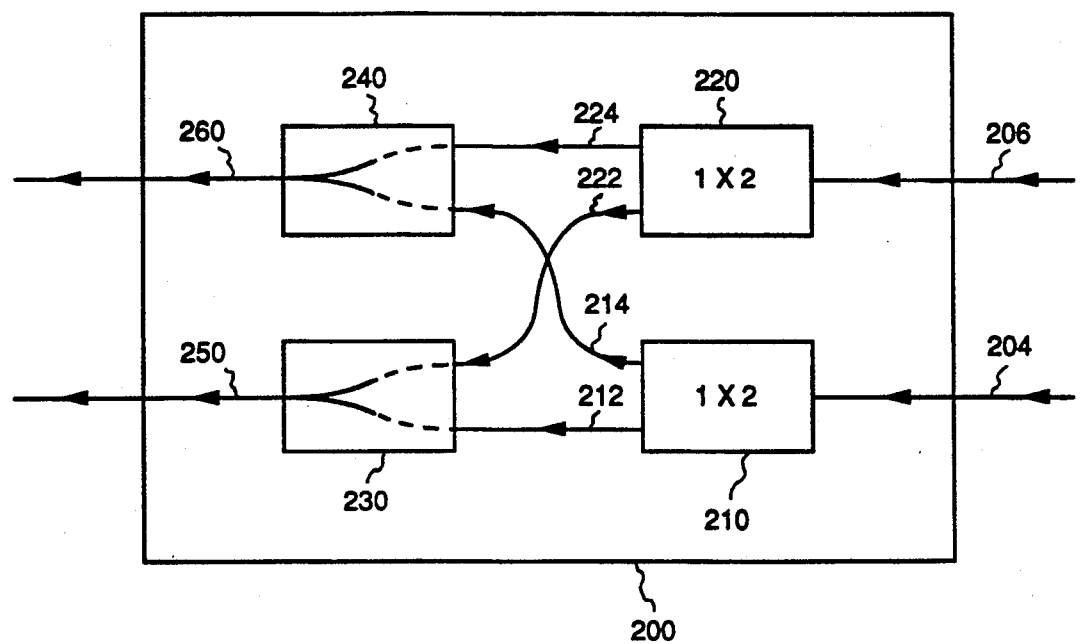
FIG. 2 is a part block and part schematic representation of a 2×2 fiber optic switch in accordance with one embodiment of the present invention.

FIG. 2 illustrates a 2×2 optical switch 200 which is readily fabricated using two 1×2 microdynamical switches. Two by two optical switch 200 comprises first and second 1×2 microdynamical fiber optic switches 210, 220 and first and second passive fiber-optic couplers 230, 240. A first switch 210 comprises a first optical input connection port 204, and a second switch 220 comprises a second optical input connection port 206. First and second 1×2 optical switches preferably comprise microdynamical optical switches having piezoelectric actuators as described above with respect to FIG. 1. The two output ports of first optical switch 210 are respectively optically coupled to a first channel optical fiber 212 and a second channel optical fiber 214. Similarly, the two output ports of second optical switch 220 are respectively optically coupled to a first channel optical fiber 222 and a second channel optical fiber 224.

First passive fiber-optic coupler 230 is coupler to first switch first channel optical fiber 212 and to second switch first channel optical fiber 222. Second passive fiber-optic coupler 240 is optically coupled to first switch second channel optical fiber 214 and to second switch second channel optical fiber 224. First passive fiber-optic coupler 230 is arranged such that optical signals received from optical fibers 212, 222 are combined to form one signal. A 2×2 switch first channel output connection 250 is optically coupled to passive coupler 230 to receive the combined optical signal therefrom. Similarly, second passive fiber-optic coupler 240 is arranged such that optical signals received from optical fibers 214, 224 are combined to form a single signal. A 2×2 switch second channel output connection 260 is optically coupled to passive coupler 240 to receive the combined optical signal therefrom.

Figure 3:
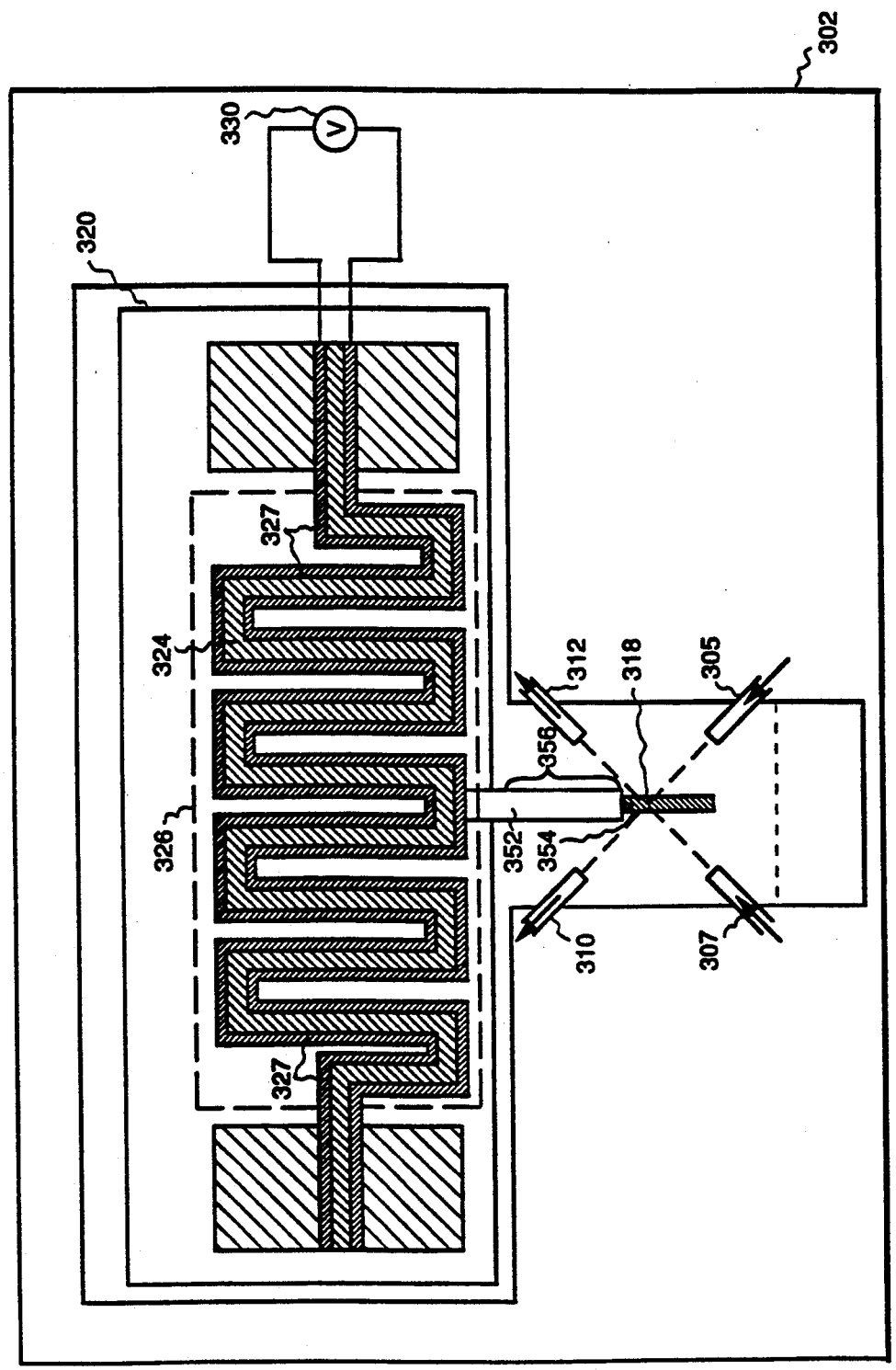
FIG. 3 is a part block and part schematic representation of a 2×2 fiber optic switch in accordance with another embodiment of the present invention.

A 2×2 microdynamical fiber optic switch 300 representing a further embodiment of the present invention is illustrated in FIG. 3. In accordance with this invention, switch 300 disposed on a substrate 302 comprises a piezoelectric actuator 320 and a voltage source 330 that can be controlled to vary the amplitude of voltage applied to the piezoelectric actuator. Voltage source 330 typically is a direct current voltage source; alternatively, a time-varying or alternating current voltage source can be used. An actuator arm 352 is securely mechanically coupled to piezoelectric actuator 320 and to a double sided mirror 354. The operation of the actuator is identical in all material respects to the operation of the actuator described above with respect to the device illustrated in FIG. 1. Application of control voltages to actuator 320 causes linear displacement of actuator arm 352 and attached mirror 354 along a mirror displacement path 356.

Switch 300 further comprises a first input connection port 305, a second input connection port 307, a first output connection port 310, and a second output connection port 312. These input and output connection ports are arranged in a crossed geometry such that the axis of first input port connection 305 is substantially aligned with the axis of first output connection port 310, and further is substantially orthogonal to the axis of second output connection port 312. Similarly, the axis of second input connection port 307 is substantially aligned with the axis of second output connection port 312. The light paths between the respective input and output connection ports cross at a crossover point 318, which point is located along mirror displacement path 356.

In operation, the mirror has two positions which correspond to the deflection of the actuator 320. In one position, mirror 354 is not interposed at the crossover point in the light paths, thus allowing input light signals to pass between the respective first and second input and output connection ports uninterrupted. When actuator 320 is deflected, mirror 354 is interposed in the light paths between the input and output connection ports. The plane of each reflective side of double sided mirror 354 is positioned to be at substantially a 45° angle to the path of the light beams emerging from each of the input connection ports. The light beams incident on each side of the mirror are deflected to a path substantially 90° from the original path that the respective light beams were travelling such that the light beam is deflected into the output port connection other than the one into which it was directed when the mirror was not interposed in the light path.

The distance the light beam travels between an input connection port and an output connection port (regardless of whether the beam is reflected by the mirror) is advantageously about 50 μm or less. When the light beams travel a distance of 50 μm or less between input and output ports, free-space propagation beam spreading is relatively small and allows efficient input/output coupling between respective input and output optical fibers, thus providing relatively high channel isolation with low insertion loss. For example, these desirable characteristics are obtained with an optical switch 300 having input and output connection ports 305, 307, 310, and 312 comprising single mode optical fibers having a core diameter of about 3.2 μm at about 514 nm, a numerical aperture of about 0.11, and a mode field width of about 3.7. In such an arrangement, mirror 354 advantageously has a diameter of about 12.5 μm and is translated by actuator 320 along a mirror displacement path about 10 μm in length. A mirror displacement path of about 10 μm also provides relatively fast switching times (i.e., tens of microseconds) between the two positions of the switch.

Alternatively, if the distance a light beam travels between an input and an output connection port is greater than about 50 μm (such as may be necessary if the size or number of input connection ports in increased), collimating devices, such as GRIN or SELFOC lenses (not shown), are advantageously coupled to the input and output connection ports so that the light beam passing through free space is collimated and thus experiences less inter-fiber free space propagation beam spreading. As noted above, use of such collimating devices may necessitate larger displacements of the mirror along a the mirror displacement path (e.g., several millimeters) to operate the switch, which in turn requires the use of levers or the like (not shown) to allow the microactuator to produce sufficient displacement of the mirror.

Actuator arm 352 and attached mirror 354 are illustrated in FIG. 3 in the position in which mirror 354 is disposed in the light path between the respective input and output connection ports. When the switch is operated to change from this switching position, actuator arm 352 is translated along the mirror displacement path substantially parallel to the plane formed by the input and output connection ports until mirror 354 is no longer disposed in the light path between the respective input and output connection ports.

In all of the embodiments of the present invention discussed above, the direction of light propagating through the switch is reversible. In other words, light can enter the switch through input port connections and be directed to output connection ports, but there is no structural impediment in the invention that would prevent light signals passing from the designed output port connections to an input port connection, if such reversible operation was so desired. Thus the use of the words "input" and "output" in the description of the invention is for ease of discussion and does not limit the manner in which the invention is employed.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A microdynamical optical switch comprising:
   a substrate;
   a piezoelectric actuator disposed on said substrate;
   a mirror mechanically coupled to said piezoelectric actuator and disposed to be translated along a mirror displacement path corresponding to deflection of said piezoelectric actuator, said mirror further having a reflective surface oriented at an angle to the path of light that passes from said input connection port;
   at least one optical input connection port; and
   a plurality of optical output ports;
   said at least one input connection port and said plurality of output connection ports being disposed so that light from said input connection port is selectively directed to a selected output connection port in dependence on the location of said mirror along said mirror displacement path, said mirror being selectively disposed along said deflection path by said piezoelectric actuator such that light passing from said input connection port is deflected into a selected output connection port when said mirror is positioned in the path of light emanating from said input connection port;
   said piezoelectric actuator comprising a plurality of micromachined piezoelectric bars arranged in a meander line geometry and which are mechanically coupled together in series and electrically coupled together in parallel.

2. The optical switch of claim 1 wherein:
   said mirror is securely mechanically coupled to said piezoelectric actuator by an actuating arm disposed substantially in alignment with said mirror displacement path; and
   a reflective surface of said mirror is oriented at substantially a 45° angle to the path of light that passes from said input connection port such that light passing from said input connection port is deflected by substantially 90° when said mirror is positioned in the path of light emanating from said input connection port.

3. The optical switch of claim 1 wherein said piezoelectric actuator further comprises:
   a controllable voltage source electrically coupled to said plurality of piezoelectric bars, the mechanical deflection of said actuator being determined by the amplitude of voltage supplied by said voltage source.

4. The optical switch of claim 3 wherein said voltage source comprises a direct current voltage source or a time-varying voltage source.

5. The optical switch of claim 3 wherein the respective distance between said at least one input connection port and each of said output connection ports is less than about 50 μm.

6. The optical switch of claim 3 wherein the distance between said at least one input connection and each of said output connections is greater than about 50 μm and said optical switch further comprises a light collimating lens coupled to each of said input connection ports.

7. The optical switch of claim 6 wherein each of said light collimating lenses comprises a device selected from the group comprising SELFLOC and GRIN lenses.

8. The optical switch of claim 3 wherein:
said at least one input connection port comprises a single input optical fiber aligned to emit light along a first axis;
each of said output connection ports comprise a respective output optical fiber aligned along a second axis, said second axis being oriented at substantially a 90° angle to said first axis;
said mirror displacement path of said mirror being substantially aligned with said first axis and said mirror being disposed so that light incident on said mirror from said input connection port is reflected into a respective one of said output optical fibers, the position of said mirror along said mirror displacement path determining the output optical fiber into which light from said input optical fiber is reflected.

9. The optical switch of claim 3, further comprising:
a first and second optical input fiber, each aligned along a respective input line axis;
said plurality of output connection ports comprising a first and second optical output fiber, each aligned along a respective output line axis;
the first input line axis being substantially aligned with the first output line axis and disposed substantially at right angles with respect to the second output line axis, and the second input line axis being substantially aligned with said second output line axis; and
said mirror displacement path being disposed to substantially pass through the intersection of said first and second input line axes such that when said mirror is displaced by said piezoelectric actuator along said mirror displacement path said mirror is disposed substantially between said respective first and second optical input and output fibers such that light emanating from said first optical input fiber is reflected into said second optical output fiber and light emanating from said second optical input fiber is reflected into said first optical output fiber, and such that when said mirror is displaced so as to not be disposed between said first and second input and output fibers light emanating from said first optical input fiber passes into said first optical output fiber and light emanating from said second optical input fiber passes into said second optical output fiber.

10. The optical switch of claim 8 wherein said mirror comprises a planar surface coated on opposite sides with an optically reflective material.

11. A microdynamical optical switch comprising:
a substrate;
a piezoelectric actuator disposed on said substrate;
a mirror mechanically coupled to said piezoelectric actuator and disposed to be translated along a mirror displacement path corresponding to deflection of said piezoelectric actuator;
at least one optical input connection port; and
a plurality of optical output ports;
said at least one input connection port and said plurality of output connection ports being disposed so that light from said input connection port is selectively directed to a selected output connection port in dependence on the location of said mirror along said mirror displacement path;
said piezoelectric actuator comprising at least one unimorph, each unimorph comprising a piezoelectric material selected from the group consisting of lead zirconate titanate ($Pb(Zr_1Ti)O_3$, aluminum nitride (AlNi), zinc oxide (ZnO), and lead titanate ($PbTiO_3$).

12. A 2×2 optical switch comprising:
a first and a second 1×2 microdynamical optical switch, each of said switches comprising a piezoelectric actuator, a mirror mechanically coupled to said piezoelectric actuator so as to move along a mirror displacement path in correspondence with the movement of said actuator, an input optical fiber connection port and a first and second output fiber connection port;
a first and a second optic channel coupler, each of said channel couplers being optically coupled to said first and second microdynamical optical switches such that light passing from said first microdynamical switch first output optical fiber port and light passing from said second microdynamical switch first output optical fiber port are combined and such that light passing from said first microdynamical switch second output fiber optical port and light passing from said second microdynamical switch second output fiber optical port are combined.

13. The optical switch of claim 12 wherein each of said actuators is controllable so as to selectively dispose said respective mirrors between respective ones of said input optical fiber connection ports and respective pairs of said first and second output optical connection ports such that light emanating from each of said respective input optical fiber ports is incident on a respective one of said mirrors such that light is reflected to pass into a selected one of said respective first and second output optical fiber ports in correspondence with the position of said mirror along said mirror displacement path.

14. The switch of claim 13 wherein:
each of said piezoelectric actuators comprises a meander path microactuator including a plurality of piezoelectric bars mechanically coupled together in series and electrically coupled together in parallel and a controllable voltage source electrically coupled to said meander path microactuator, the mechanical deflection of said microactuator being determined by to the magnitude of the voltage applied by said voltage source.

15. The switch of claim 14 wherein:
said mirrors are securely mechanically coupled to respective ones of said piezoelectric actuator by an actuating arm disposed substantially in alignment with said mirror displacement path; and
a reflective surface of said mirror is oriented at substantially a 45° angle to the path of the light passing from said respective input connection ports so that light passing from respective ones of said input connection ports is deflected by substantially 90° when said respective mirrors are positioned in the respective paths of light emanating from said input connection ports.

16. A method of switching an optical signal comprising:
   passing an optical signal through an optical input connection port, said optical input port being disposed in a spaced relationship with a plurality of optical output connection ports; and
   selectively displacing a mirror along a mirror displacement path positioned to be disposed at least partially along the axis on which light beams emanate from said optical input connection port, the position of said mirror along said displacement path determining the optical output connection port into which the light beams emanating from said input connection port pass;
   the selective displacement of said mirror along said mirror displacement path being determined by controlling a piezoelectric actuator comprising a plurality of micromachined piezoelectric bars arranged in a meander line geometry and that are mechanically coupled to said mirror.

17. The method of claim 16 wherein the step of selectively displacing said mirror comprises positioning said mirror along said mirror displacement path so that light passing from said optical input connection port is deflected by substantially 90° to enter a selected one of said optical output connection ports.

18. The method of claim 17 wherein the step of controlling said piezoelectric actuator further comprises controlling the amplitude of a voltage source electrically coupled to said piezoelectric actuator.

19. The method of claim 18 wherein the step of selectively displacing said mirror along said mirror displacement path comprises displacing said mirror along an axis substantially aligned with the axis of said optical input connection port.

20. The method of claim 18 wherein the step of selectively displacing said mirror along said mirror displacement path comprises displacing said mirror along an axis that intersects the axis of light emanating from said optical input connection port at substantially only one location.

* * * * *